T867002

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 747

836,208

METHOD OF MAKING HOT MELT-COATED SUBSTRATES HEAT-SEALABLE

James E. Dickert, P.O. Box 511, Kingsport, Tenn. 37662

Continuation of application Ser. No. 555,226, June 6, 1966. This application June 12, 1969. Published Oct. 21, 1969

Int. Cl. B44d *1/50*

U.S. Cl. 117—62

No Drawing. 5 Pages Specification

Coatings of hot melt-coated substrates are rendered heat-sealable by immersing said coatings in an electrical corona discharge said coatings consisting essentially of thermoplastic material having a Brookfield melt viscosity of not more than 50,000 cps. at 300° F. and is selected from the group consisting of polyolefins, petroleum waxes, blends of polyolefins and petroleum waxes, blends of petroleum waxes and polyvinyl acetates, blends of petroleum waxes and rubber, blends of petroleum waxes and copolymers of ethylene and a vinyl monomer, and blends of petroleum waxes and copolymers of ethylene and an acrylic monomer.